United States Patent [19]

Liu et al.

[11] Patent Number: 4,771,608
[45] Date of Patent: Sep. 20, 1988

[54] NON-CONTAMINATING FLOW VISUALIZATION SYSTEM

[75] Inventors: Benjamin Y. H. Liu, North Oaks; James W. Ramsey, Golden Valley, both of Minn.

[73] Assignee: Regents of the University of Minnesota, Minneapolis, Minn.

[21] Appl. No.: 8,871

[22] Filed: Jan. 29, 1987

[51] Int. Cl.⁴ .................................. F17C 7/02
[52] U.S. Cl. ............................. 62/50; 62/50
[58] Field of Search ................. 62/50, 54, 52

[56] References Cited

U.S. PATENT DOCUMENTS 2,406,540  8/1946  Harrington ................. 62/54

OTHER PUBLICATIONS

"Liberty Smoke Guns and Sticks for Air Behavior", *Liberty Industries, Inc.*, Title page, pp. 87, 183, 6/1985.

*Primary Examiner*—Henry A. Bennet
*Attorney, Agent, or Firm*—Kinney & Lange

[57] ABSTRACT

A flow visualization system usable for clean rooms to determine the flow conditions that exist during manufacture, includes a non-contaminating source of a visible stream of a fog comprising water droplets which evaporaate and leave no residue. Steam is generated in a boiler and it passed over an interface with a cryogenic material to form a high density fog generator providing a highly visible fog that is neutrally bouyant and non-contaminating.

12 Claims, 2 Drawing Sheets

NON-CONTAMINATING FLOW VISUALIZATION SYSTEM

BACKGROUND OF THE INVENTION

1. Field of the Invention

The present invention relates to means for generating fog that does not contain any particular contaminates.

2. Description of the Prior Art

Various flow visualization devices have been advanced for generating a fog, but the fogs produced leave residue when the water droplets forming the fog evaporate. When using a fog for determining the flow characteristics within a clean room, it is essential that the fog being used does not add contamination and leaves no residue upon evaporation. Thus the water droplets forming the fog have to be relatively pure and with no substantial size contaminated particles carried in them.

Present fog generators generally are not sufficiently clean or non-contaminating to be satisfactory for clean room use.

SUMMARY OF THE INVENTION

The present invention relates to a fog generator that is non-contaminating and can be used for analyzing air flows within a clean room. The generator comprises a device for producing steam that is water vapor, and passing it over an interface in a cryogenic material such as liquid nitrogen, to condense the water vapor in the steam to form a fog that is then delivered to the clean room through suitable nozzles. The amount of flow can be controlled by the pressures in the boiler forming the steam supply, and suitable flow control valves in lines used. By appropriately passing the material over the liquid nitrogen the water vapor condenses quickly into water droplets that do not precipitate out, and provides a highly visible fog for determining flow patterns in rooms into which the fog is introduced.

The apparatus shown herein comprises a pressure controlled boiling chamber, with an outlet that passes through a flow control valve and into a Dewar cryogen flask containing liquid nitrogen or some other cryogen. The steam generated in the boiler flows past and contacts the surface of the liquid nitrogen producing a fog of very high droplet concentration. The fog then leaves the chamber containing the nitrogen through a delivery tube which terminates either with a single opening nozzle or a nozzle that has a plurality of openings.

The pressure needed to operate the system is provided entirely by the boiler chamber and flow is controlled by the flow control valve. There is no need for introduction of additional air or other carrier gases for moving the fog along its path. It is desirable to have the flow neutrally buoyant as well as non-contaminating, and the fog generated with the present device meets both criteria.

Suitable controls are provided for maintaining a uniform pressure and flow of steam, and sensors can be provided for maintaining proper liquid levels as well as the level of the cryogenic material, such as liquid nitrogen.

Thus, the present invention provides a highly efficient fog producing apparatus that provides non-contaminating fog for visually determining flow characteristics.

DETAILED DESCRIPTION OF THE PREFERRED EMBODIMENTS

Figure 1:
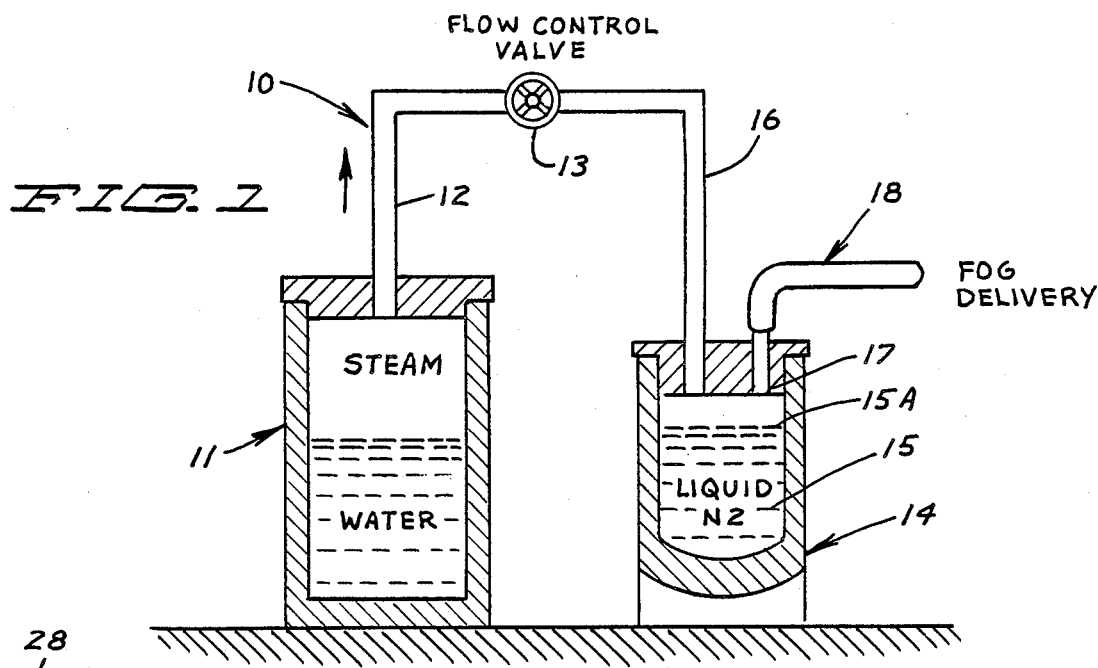
FIG. 1 is a schematic representation of a non-contaminating flow visualization system made according to present inventions.

Referring first to FIG. 1, a schematic representation of a non-contaminating flow visualization system is illustrated. In a simplified schematic form, the fog generating system indicated generally at 10 comprises a boiler 11 in which steam is generated, and the steam is passed through a line or tube 12 through a flow control valve 13 and into a Dewar cryogen flank or container 14 that is insulated for containing a cryogen such as liquid nitrogen indicated at 15 therein. The outlet side of the flow control valve is connected to a tube 16 that leads to the Dewar container and has its end terminating above the level indicated at 15A of the cryogen. As the steam passes across the surface of the cryogen it condenses out into dense water droplets forming a fog which, because of the pressure from the steam boiler, flows out through an exit orifice 17 and through a fog delivery tube and nozzle assembly indicated generally at 18.

In its simplified form, the essential elements for obtaining the desired fog characteristics are provided by having a boiler that permits water to be changed to steam, leaving dissolved impurity and suspended particulate contaminants behind in the steam boiler. Usually, high purity, deionized water is used in the boiler to further reduce the possibility of contaminants being introduced into the fog. The pressure in the boiler is sufficient so that the flow control valve 13 can regulate the amount of flow necessary for the needs of the visualization system. The distance of the steam discharge opening above the surface of the liquid nitrogen is important in determining the characteristics of the fog that is generated, namely, this spacing determines the temperature and density of the fog and can be controlled for obtaining the desired characteristics.

Figure 2:
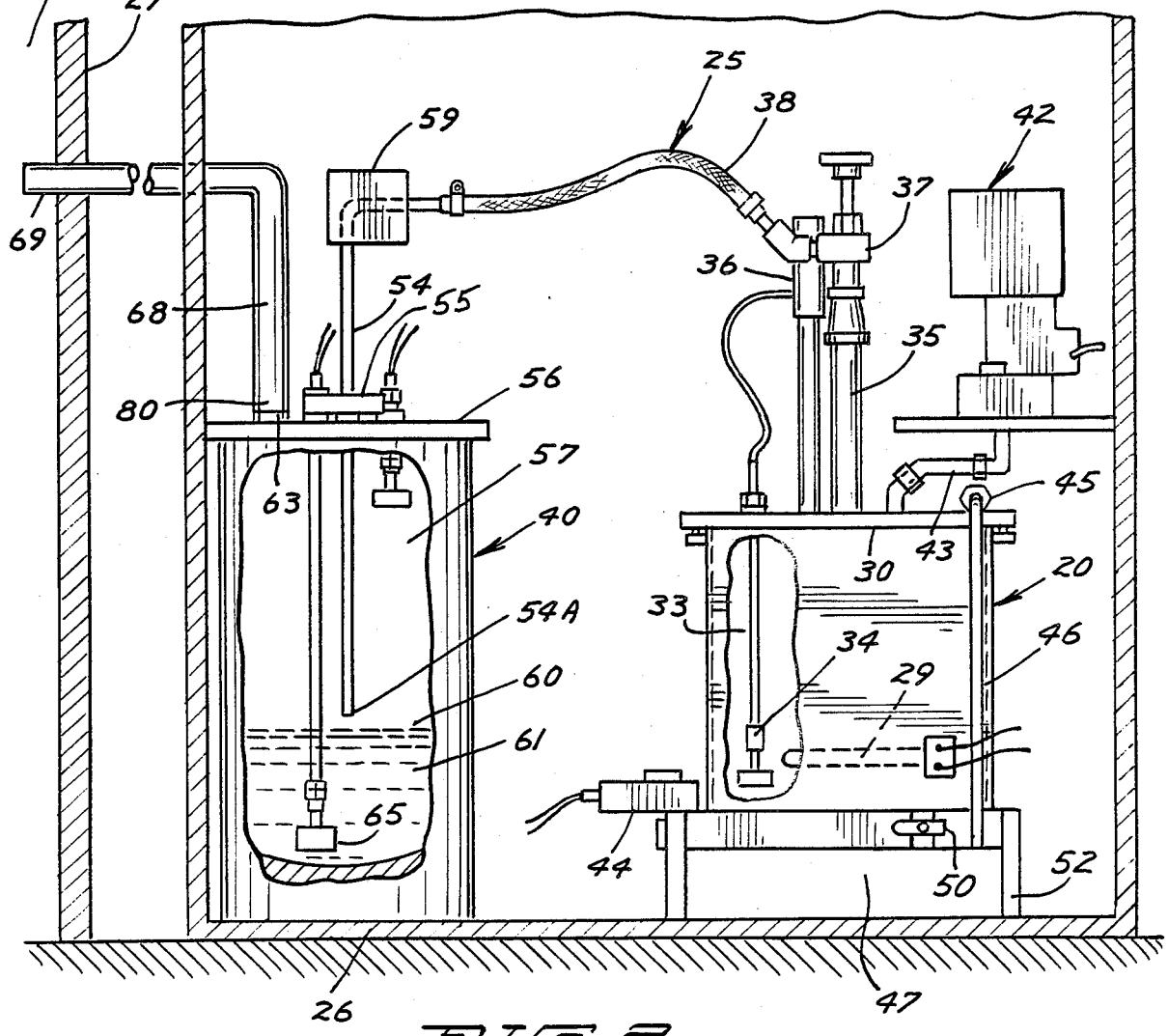
FIG. 2 is a side elevational view of a more detailed showing of the device of the present invention with parts shown schematically for illustrative purposes.

A more detailed form of the invention is shown in FIG. 2. The flow visualization system indicated generally at 25 is mounted in an outer housing or cabinet 26 in a suitable manner, and is positioned either within or adjacent to a wall 27 of a clean room 28 into which the fog will be discharged.

In this form of the invention, the cabinet 26 houses a boiler 20 which can be of any conventional design. It includes a heater element shown schematically at 29 on the interior, and has a upper cover 30 which encloses the boiler chamber indicated at 33. The heater element 29 is an electric heater element that has sufficient capacity to heat the water to cause steam to be formed and evaporate the water. The heater may be embedded into the bottom wall of the boiler, if desired. A conventional low water float switch 34 is used for controlling an inlet fill valve 36 to add water to the interior chamber 33 as the level falls below a desired amount.

The steam outlet pipe indicated at 35 is fastened to the cover 30 in a suitable manner, and the outlet pipe 35 has a flow control valve 37 therein which is connected to an outlet land or tube 38 leading to the fog forming cryogenic container indicated generally at 40.

The heater 29 is controlled with a separate boiler pressure switch indicated generally at 42 that has a pressure sensing tube 43 leading to the interior chamber 33 of the boiler. The pressure switch 42 is a primary power control for the heater 29 to keep the heater operating to maintain the pressure in the boiler at a desired set level. A secondary safety temperature switch indicated at 44 is also provided for controlling power to the heater in series as will be seen from the schematic diagram. A safety relief valve 45 is provided to and will open when boiler pressure exceeds the preset amount. A drain tube 46 is connected to the output side of the relief valve. The tube aligns with a waste water pan 47 that catches waste water from the relief valve. The waste water pan can be positioned below the boiler, and also can be used for catching drain water from a drain water valve 50 of the boiler. The boiler is supported on suitable legs 52 to provide a place for the waste water pan. This equipment is all inside the cabinet 26.

The outlet line or tube 38 from the flow control valve 37 connects to a steam tube 54 that passes through an adjustment clamping nut arrangement 55 and through a cover 56 of the Dewar flask and into the interior chamber 57 of the flask. An insulating (plastic) handle 59 is provided on the steam tube 54. The adjustment clamping nut arrangement 55 is large enough so that it can be hand operated to loosen, and thus permit an operator to adjust the tube 54 up or down to bring the discharge end 54A of the tube 54 to the desired level above the surface 60 of the liquid nitrogen 61.

The tube is moved manually, and proper adjustment can aid in changing the characteristics of the fog that is generated as the steam passes over the surface 60 and then, because of the internal boiler pressure, the fog is discharged from the Dewar flask through a discharge fitting 63.

A float switch indicated at 65 is used as shown for determining low level of nitrogen, and lights an indicator light and turns off the heater 29. Liquid nitrogen is introduced through the fog exit fitting 63. Additionally if desired, a high level switch 66 can be used for lighting a light indicator when the nitrogen reaches too high a level.

The outlet fitting 63 is connected to suitable tubing, indicated at 68, that generally will have a smooth interior surface to avoid collection of water droplets and the like. The tube 68 is coupled to a nozzle 69 that discharges into a clean room 28. The fog that is formed in Dewar flask 40 is highly concentrated and is visible to the naked eye, so that the flow characteristics within the room can be observed, and if desired recorded on video tape for later analysis.

The flow is carried by the boiler pressure which is maintained at a desired level. Boiler pressure is maintained with the pressure operated switch 42. A substantially constant pressure will be provided to the flow control valve 37. Adjusting the valve 37 achieves the desired flow rate of steam. The pressure actuated switch 42 is selected to have a very small deadband width and preferably can be adjusted to maintain pressure at between 2 and 12 inches of water. Such switches are commercially available. The delivery tube for the fog can be in the range of 1½ inch to 2½ inch I.D. hose of conventional design. Plastic hose is preferred. The insulating handle 59 permits moving the steam tube 54 up and down to achieve the desired density of the fog being formed without endangering the operator.

Figure 3:
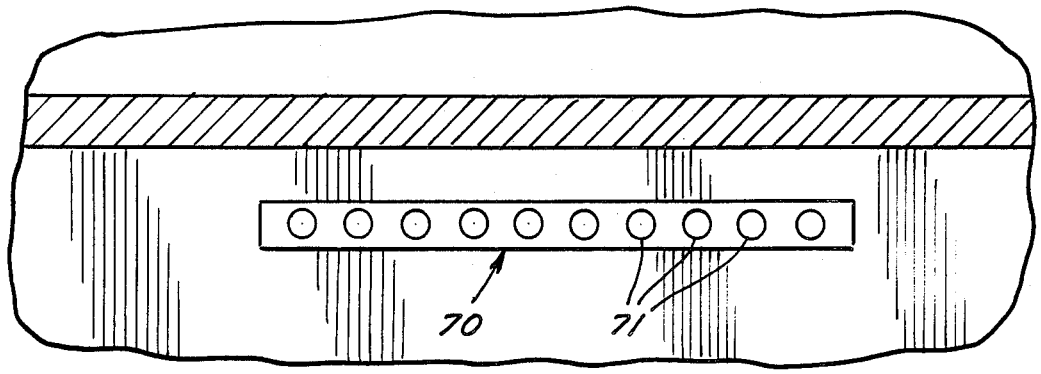
FIG. 3 is a view of a multiple outlet nozzle that can be used with the flow visualization system of the present invention.

If desired, the discharge nozzle array shown in FIG. 3 can be used. A header tube 70 having a plurality of nozzles 71 can be positioned where desired inside the clean room that is to be checked out, and by selecting the nozzles and the flow rate into the header tube the desired amount of fog can be discharged.

Figure 4:
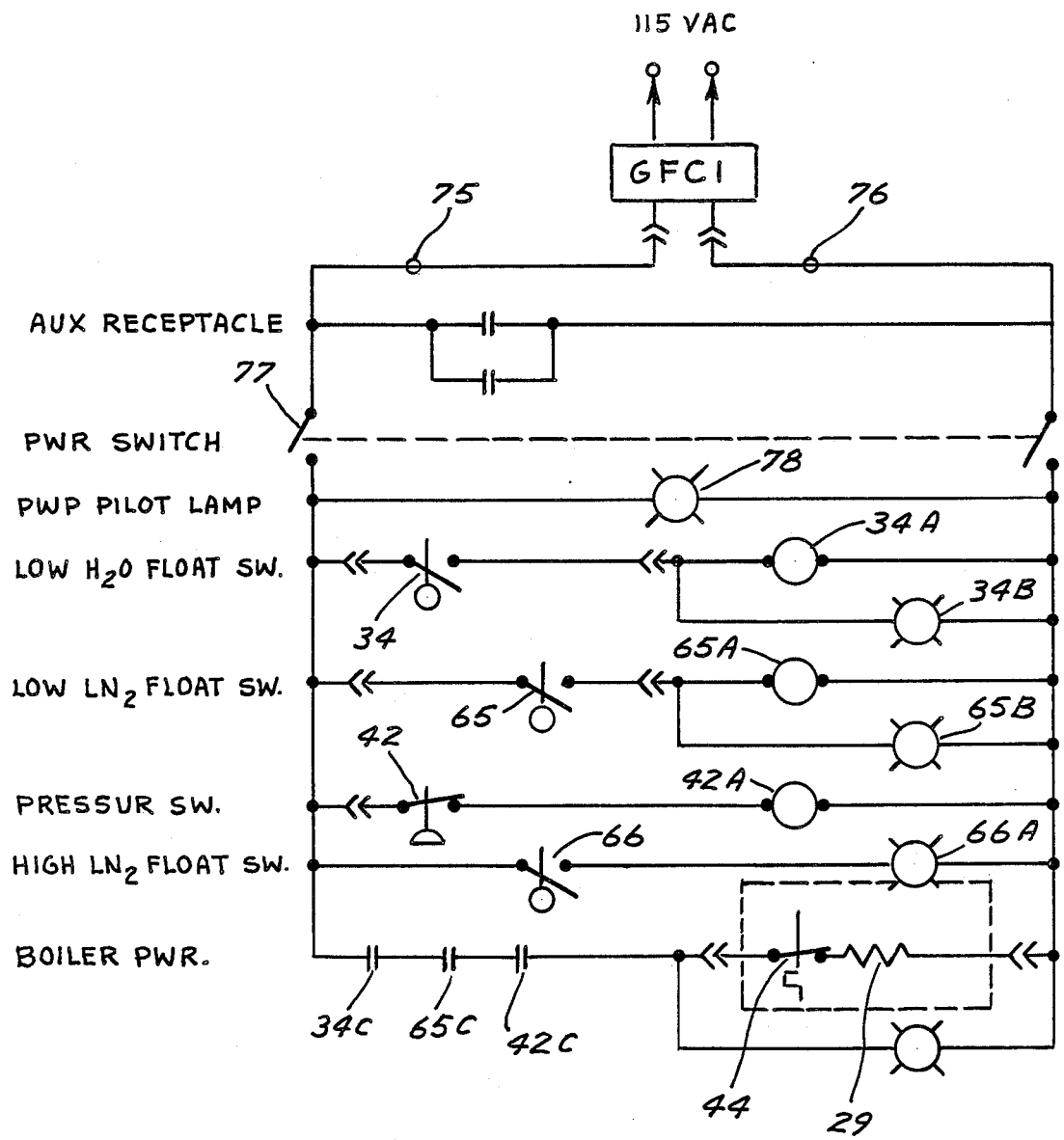
FIG. 4 is an electrical schematic representation of a circuit used for controlling the apparatus of FIG. 2.

A schematic control system is shown in FIG. 4. Power is supplied from a ground fault interrupter breaker along lines 75 and 76, respectively. The power switch indicated at 77 controls power to the rest of the system, and a pilot light 78 is provided across the lines.

The low water float switch 34 is connected to a relay 34A and an indicator light 34B. The light indicator lights when the level of water is low and the switch 34 is closed.

A low nitrogen float switch indicated at 65 is connected to a second relay 65A and a green indicator light 65B, which are energized and light respectively when the nitrogen is above the low level. The switch lights the light 65B to indicate that nitrogen should be added, and also opens the contacts energized by the relay coil 65A, which control power to heater 29.

The pressure switch 42 is connected across the lines, and is used for energizing a third relay 42A.

If desired, a high nitrogen float switch indicated at 66 can be provided to energize a red indicator light 66A, but not to control any other functions.

The heater 29 is connected across the power lines in series with the temperature switch 44, and also in series with relay contacts 34C, 65C, and 42C, which are coupled with respective relays 34A, 65A, and 42A. All three of these contacts or switches have to be closed, that is all three of the relays have to be energized, before the heater 29 will be powered. It can be seen that the temperature switch 44 is also connected in series to the heater and acts as a safety switch. As the pressure switch 42 cycles, the heater 29 will be turned on and off to maintain the pressure in the boiler at the desired level.

Thus by controlling the boiler pressure and the flow using flow control valve 37, the amount of steam passing across the nitrogen surface can be controlled. The float switches used are magnetically coupled switches, and also are commercially available.

If desired, suitable viewing ports can be provided in both the boiler and the nitrogen Dewar flask so that the levels can be determined visually and easily. An option, as shown in FIG. 2, comprises the use of a temperature sensor 80 mounted in the steam outlet fitting 63, or at some other suitable location to sense the temperature of the fog, and in this way to permit analyzing the fog so that it can be maintained neutrally bouyant by adjusting the height of the steam pipe 54 and the end 54A thereof relative to the surface of the cryogen liquid.

The apparatus shown is non-contaminating; that is, it forms a fog without contaminating particles, and it has been determined that no particles larger than 0.15 microns will have passed through the system. The only sources of the particles would be the liquid nitrogen and water and both are unlikely to contain large particles. The boiler water is usually deionized and highly purified. The procedure used to produce the fog is such that any contaminant particles in the liquid nitrogen and in the deionized water used in the steam boiler should remain in the liquids rather than become aerosols.

Although the present invention has been described with reference to preferred embodiments, workers skilled in the art will recognize that changes may be made in form and detail without departing from the spirit and scope of the invention.

What is claimed is:

1. A non-contaminating flow visualization fog generator system for indicating airflow in a room comprising:
   means for providing a flow of steam;
   means for regulating the volume of the flow of steam;
   a reservoir containing a liquid cryogen having an exposed surface;
   discharge means receiving the flow of steam and discharging the flow of steam adjacent to the cryogen surface whereby the steam passes over the cryogen surface and changes to a fog containing water droplets; and
   means for permitting discharge of the fog from the reservoir containing the cryogen into a room.

2. The apparatus as specified in claim 1 and nozzle means connected to the means for permitting discharge from the reservoir containing the cryogen for discharging a fog formed.

3. The apparatus as specified in claim 1 wherein said means for controlling flow of steam to the reservoir containing the cryogen comprises a flow control valve.

4. The apparatus as specified in claim 1 wherein said means for providing steam comprises a boiler, and control means associated with said boiler for regulating the pressure within said boiler and thus within the reservoir containing the cryogen.

5. The apparatus as specified in claim 1 wherein said means for providing a flow of steam comprises means for providing steam at a desired range of pressure.

6. A non-contaminating flow visualization fog generator system comprising:
   means for providing a flow of steam at a desired volume;
   a source of a liquid cryogen;
   means for coupling the flow of steam to the source of liquid cryogen so the steam interfaces with the cryogen whereby the steam changes to a visible fog; and
   means for permitting discharge of the visible fog in a desired location.

7. The apparatus of claim 6 wherein said source of liquid cryogen comprises a reservoir containing the liquid cryogen, said liquid cryogen having an exposed surface over which the steam is passed to provide the interface with the liquid cryogen.

8. The apparatus as specified in claim 6 and means for controlling flow of steam comprising a flow control valve.

9. The apparatus as specified in claim 7 wherein said means for providing a flow steam comprises a boiler, and control means associated with said boiler for regulating the pressure within said boiler.

10. The apparatus of claim 6, and wherein said means for providing a flow of steam comprises steam generator means, and a supply of high purity water for supplying to the steam boiler to minimize contaminants in the fog formed.

11. The apparatus as specified in claim 6 and means for determining the temperature of the steam and means for regulating the temperatuare of the steam so the steam neutrally bouyant.

12. The apparatus as specified in claim 11, wherein the means for coupling the flow of steam to the source of liquid cryogen comprises a discharge tube that overlies a surface of the cryogen, and the means for regulating comprises adjustable means for adjusting the end of the discharge tube relative to the surface of the cryogen to control the characteristics of the fog formed.

* * * * *